(12) United States Patent
Campbell et al.

(10) Patent No.: US 9,679,345 B2
(45) Date of Patent: Jun. 13, 2017

(54) METHOD AND SYSTEM FOR FRAME PACING

(71) Applicant: Advanced Micro Devices, Inc., Sunnyvale, CA (US)

(72) Inventors: Jonathan Lawrence Campbell, Orlando, FL (US); Mitchell H. Singer, Oviedo, FL (US); Yuping Shen, Orlando, FL (US); Yue Zhuo, Shanghai (CN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/820,221

(22) Filed: Aug. 6, 2015

(65) Prior Publication Data

US 2016/0042488 A1    Feb. 11, 2016

Related U.S. Application Data

(60) Provisional application No. 62/035,124, filed on Aug. 8, 2014.

(51) Int. Cl.
| | | |
|---|---|---|
| *G06T 1/20* | (2006.01) | |
| *G06F 17/30* | (2006.01) | |
| *G09G 5/36* | (2006.01) | |

(52) U.S. Cl.
CPC .......... *G06T 1/20* (2013.01); *G06F 17/30044* (2013.01); *G09G 5/363* (2013.01); *G09G 2340/0435* (2013.01); *G09G 2360/06* (2013.01)

(58) Field of Classification Search
None
See application file for complete search history.

(56) References Cited

U.S. PATENT DOCUMENTS

| | | | |
|---|---|---|---|
| 6,919,900 B2 * | 7/2005 | Wilt | G09G 5/14 345/534 |
| 7,545,380 B1 | 6/2009 | Diard et al. | |
| 8,484,647 B2 * | 7/2013 | Hendry | G06F 9/3879 345/522 |
| 2002/0130870 A1 | 9/2002 | Ebihara | |
| 2005/0057571 A1 * | 3/2005 | Stevens | G06F 1/32 345/501 |
| 2011/0157193 A1 * | 6/2011 | Boucher | G06F 3/1438 345/505 |
| 2012/0062573 A1 | 3/2012 | Kashimoto | |
| 2012/0281562 A1 | 11/2012 | Holmer | |
| 2015/0109326 A1 * | 4/2015 | Romano | G09G 5/18 345/618 |

FOREIGN PATENT DOCUMENTS

WO    2012154155 A1    11/2012

* cited by examiner

*Primary Examiner* — Joni Richer
(74) *Attorney, Agent, or Firm* — Volpe and Koenig, P.C.

(57) ABSTRACT

A frame pacing method, computer program product, and computing system are provided for graphics processing. A method and system for frame pacing adds a delay which evenly spaces out the display of the subsequent frames, and a measurement mechanism which measures and adjusts the delay as application workload changes in an evenly spaced manner.

18 Claims, 18 Drawing Sheets

METHOD AND SYSTEM FOR FRAME PACING

CROSS REFERENCE TO RELATED APPLICATION

This application claims the benefit of U.S. provisional application No. 62/035,124, having a filing date of Aug. 8, 2014, which is incorporated by reference as if fully set forth.

FIELD OF THE INVENTION

The present invention is generally directed to graphics processing.

BACKGROUND

Graphics processing is generally performed using a combination of a central processing unit (CPU) and multiple graphics processing units (GPUs). In rendering systems using multiple GPUs, each GPU renders a complete frame and presents it for display as it completes the frame. If frames for each GPU complete rendering near when another GPU completes rendering, then the first frame(s) rendered will be displayed on the screen for less time than the subsequent frames, (which are already completed). If the amount of time that frames are displayed is not evenly spaced, the user may visually see and perceive lower frame rates, (effectively causing a stutter). This is nominally called frame stuttering or micro-stuttering. Methods and systems are needed to overcome visual and/or perceived frame stuttering and/or micro-stuttering for applications, such as 3D applications, rendered by multiple GPUs.

SUMMARY

Described herein is a method and system for frame pacing. In general, frame pacing adds a delay which evenly spaces out the display of the subsequent frames, and a measurement mechanism which measures and adjusts the delay as application workload changes.

BRIEF DESCRIPTION OF THE DRAWINGS

A more detailed understanding may be had from the following description, given by way of example in conjunction with the accompanying drawings wherein.

DETAILED DESCRIPTION

Described herein is a method and system for frame pacing. In general, an estimate is made as to how long it takes to render a frame. This may be done by measuring how long it takes for a graphics processing unit (GPU) to render the frame. An average over several recent frames is used to smooth out differences in workload from frame to frame and render speed of the GPUs. A heartbeat is created that controls the progress of the GPUs and smooths out their presents. The determined appropriate amount of time is waited in the driver, (for example, the kernel mode driver (KMD)), so that the frames are evenly spaced. Frame pacing essentially postpones the flipping of a frame in one GPU that may come too early with respect to another GPU.

Figure 1:
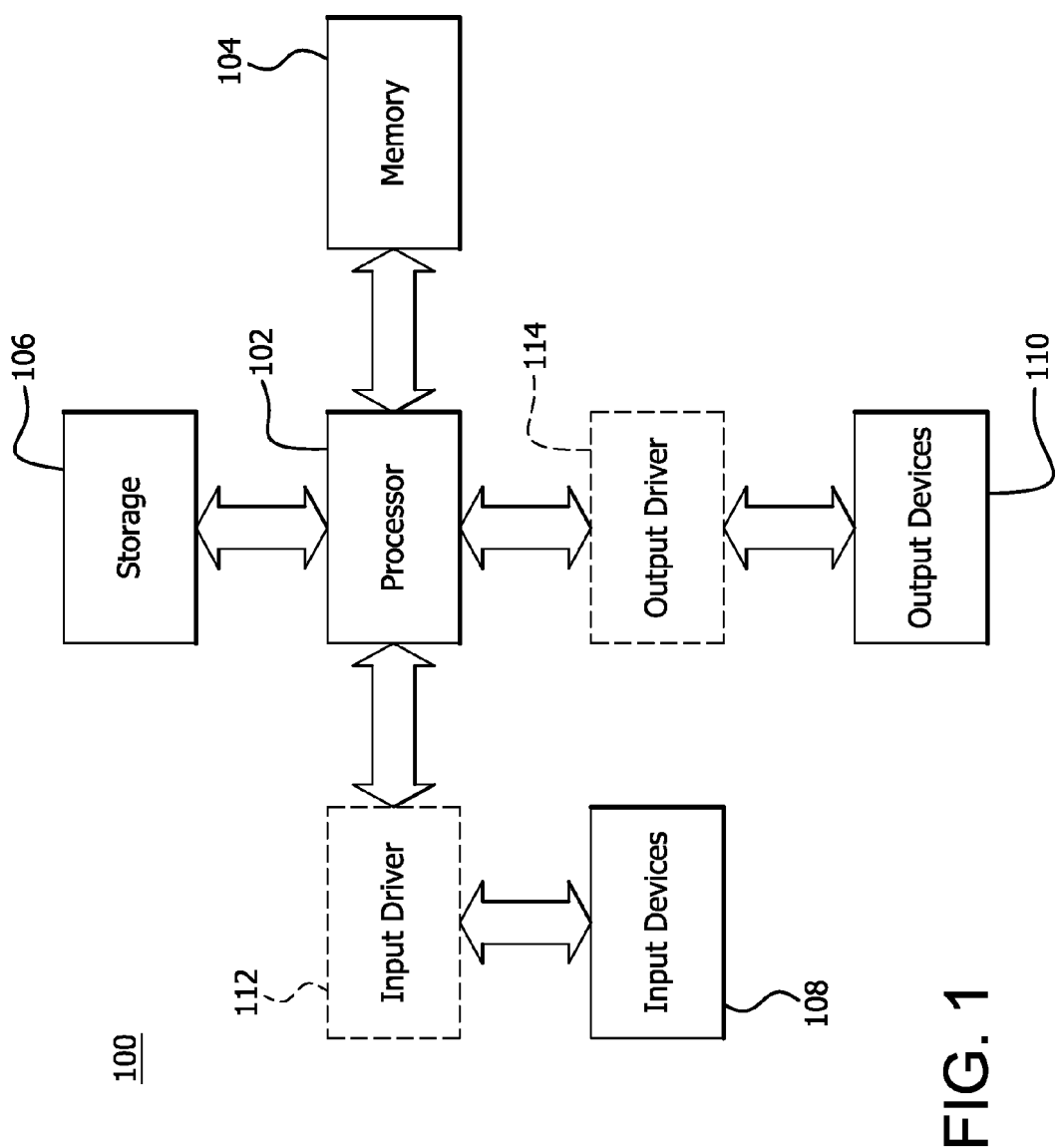
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. The GPUs may be the same type of GPU (symmetric crossfire) or different types of GPUs (asymmetric crossfire (ACF)). For example, the GPUs in a processor or system may include, but is not limited to, accelerated processing units (APUs), discrete GPUs (dG-PUs), and/or combinations thereof.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
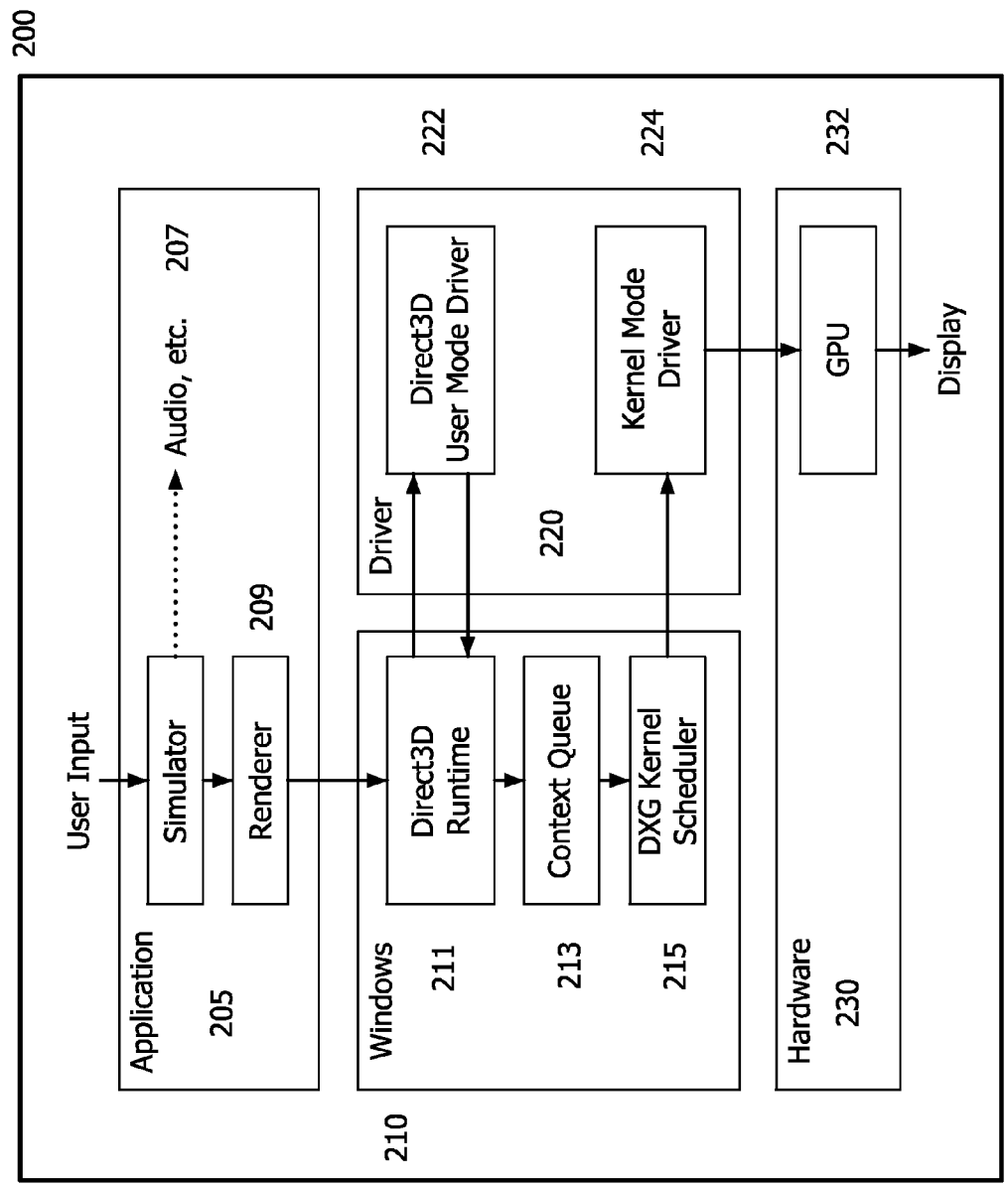
FIG. 2 is an example graphics rendering pipeline in accordance with some embodiments.

FIG. 2 is an example graphics rendering pipeline 200. For purposes of illustration and to provide context, the graphics rendering pipeline 200 is shown using a Windows® based operating system (O/S) but any O/S may be used. In general, the graphics rendering pipeline 200 includes an application module/layer/entity 205, a Windows® O/S module/layer/entity 210, a driver module/layer/entity 220 and hardware 230. The term module/layer/entity will be collectively referred to as entity herein.

The application entity 205 handles, among other functionality, user input. The application entity 205 includes a simulator 207 that updates, for example, object positions, physics and the like with respect to a game world, for example. The simulator 207 is coupled or connected, (referred to as connected herein), to a renderer 209 that creates draw calls via, for example, a Direct 3D API, to generate a frame. The renderer 209 is coupled to a Direct3D runtime entity 211 which parses commands and calls User Mode Driver (UMD) 222 via a DDI interface. The UMD 222 generates GPU command buffers and submits them to Windows® O/S 210 and in particular, the Direct3D runtime entity 211. The GPU command buffers are then placed in a context queue 213 until the Windows® O/S 210 kernel scheduler 215 is ready to accept them. The GPU command buffers are passed to the Kernel Mode Driver (KMD) 224, which processes them and sends them to the GPU 232. The application entity 205 sends present calls when a frame has finished rendering and can be displayed. The present calls follow the same logical path as the draw calls.

Figure 3:
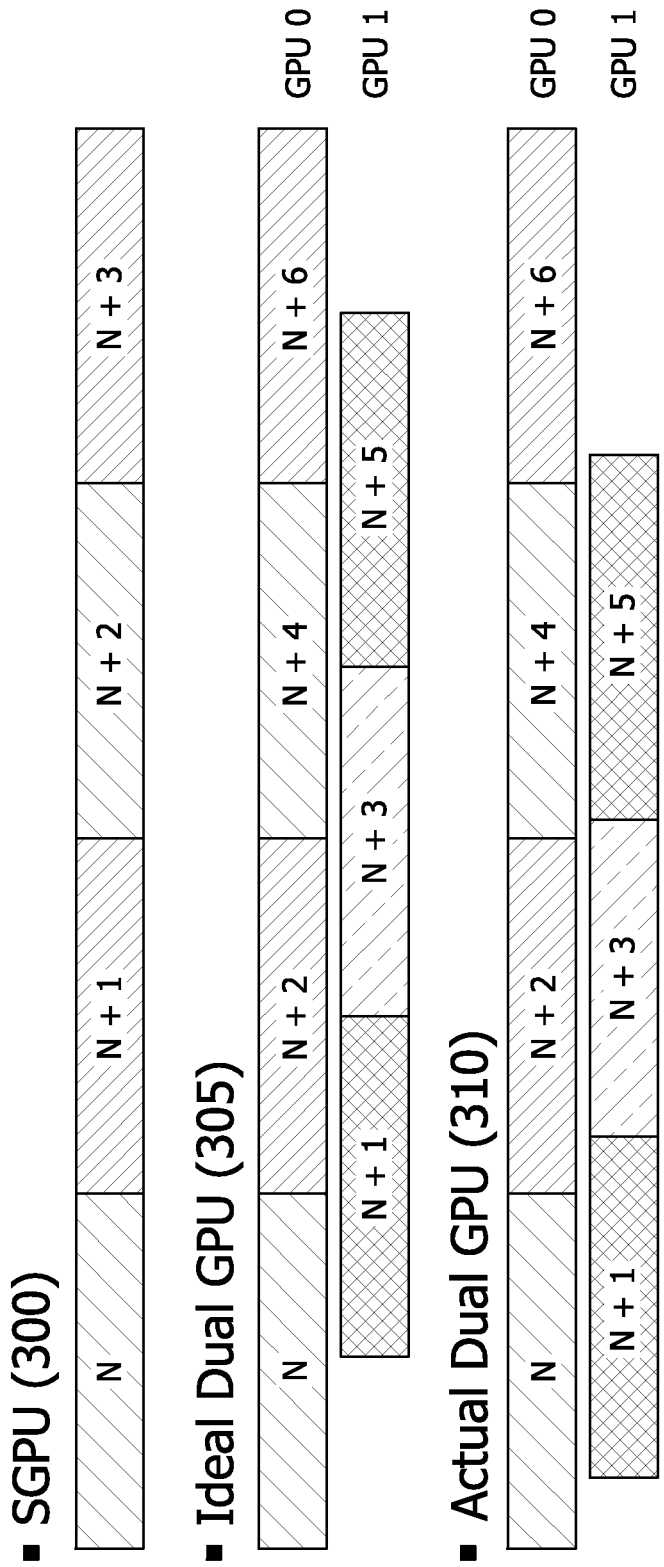
FIG. 3 is an example of rendering in a dual graphics processing unit (GPU)

FIG. 3 visually illustrates the micro-stuttering issue when using multiple GPU architecture for graphics processing. In general, work assignments or allocations amongst the multiple GPUs use a process called Alternate Frame Rendering (AFR), where each GPU gets its own frame in contrast to each of the multiple GPUs working on a part of the same frame. AFR works well when the output of each GPU is paced such that each GPU is delivering a rendered frame at as even as a rate as possible. For example, as shown in FIG. 3, in a single GPU (SGPU) flow 300, the frames are rendered and presented one after another. In the ideal dual GPU flow 305, the output of GPU 1 is complete when GPU 0 is approximately half-way complete with its frame. However, what actually happens is shown in actual dual GPU flow 310. If the frame for GPU 1 is completed near when GPU 0 completes rendering, then the first frame rendered will be displayed on the screen for less time than the second or subsequent frame. If the amount of time that frames are displayed is not evenly spaced, the user may visually see and perceive lower frame rates, i.e., micro-stuttering.

Described herein is a method and system for frame pacing.

Figure 4:
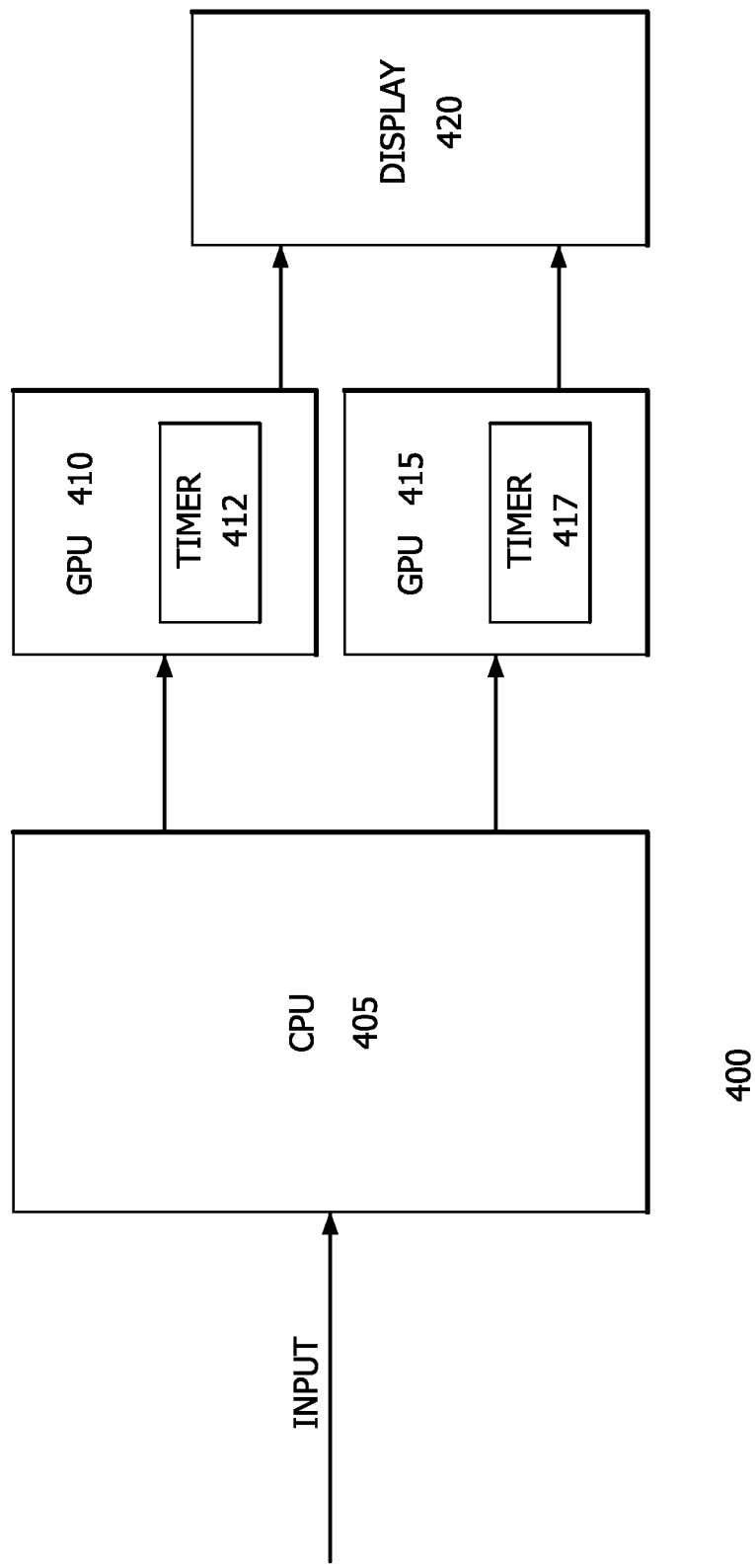
FIG. 4 is an example high level block diagram for frame pacing in accordance with some embodiments.
Figure 5:
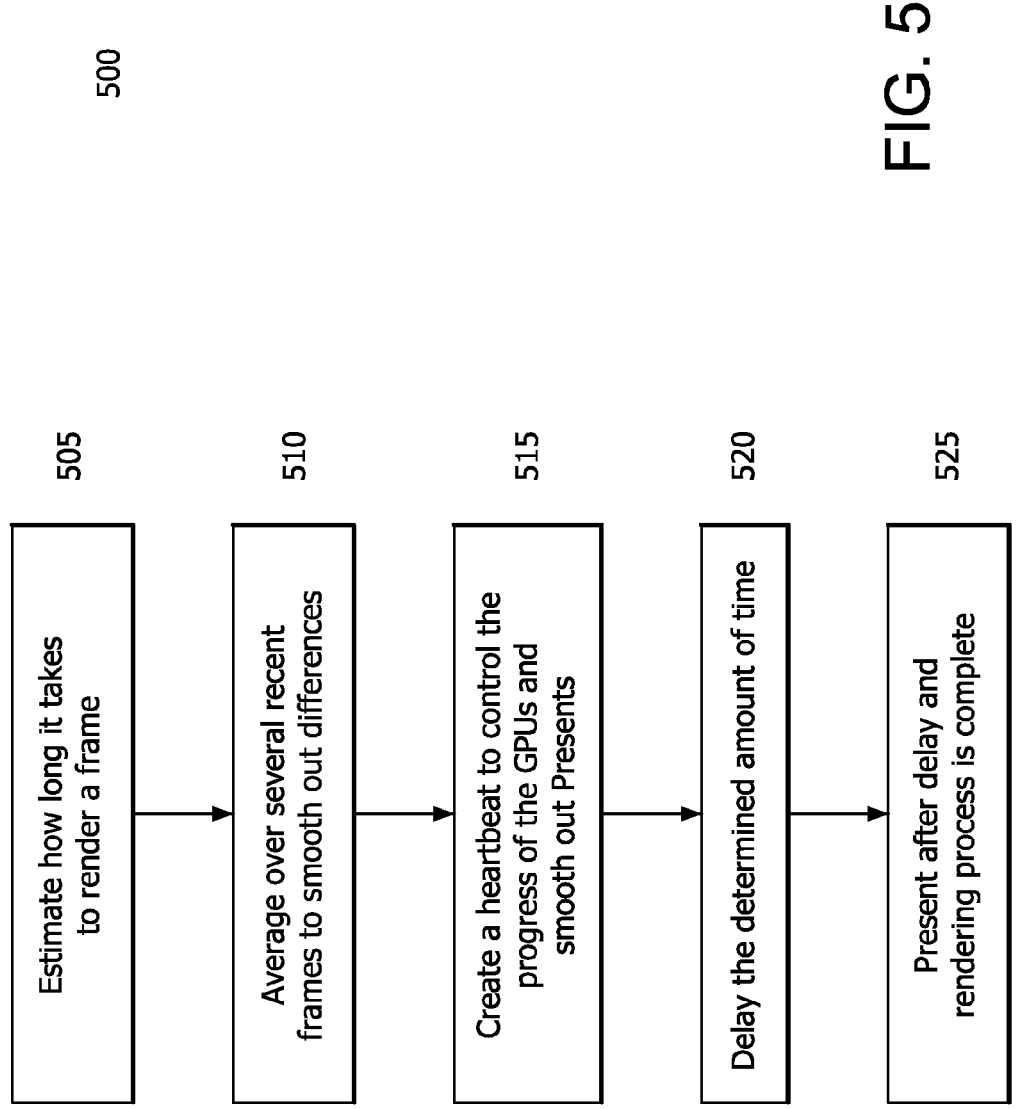
FIG. 5 is an example flowchart for frame pacing in accordance with some embodiments.
Figure 6:
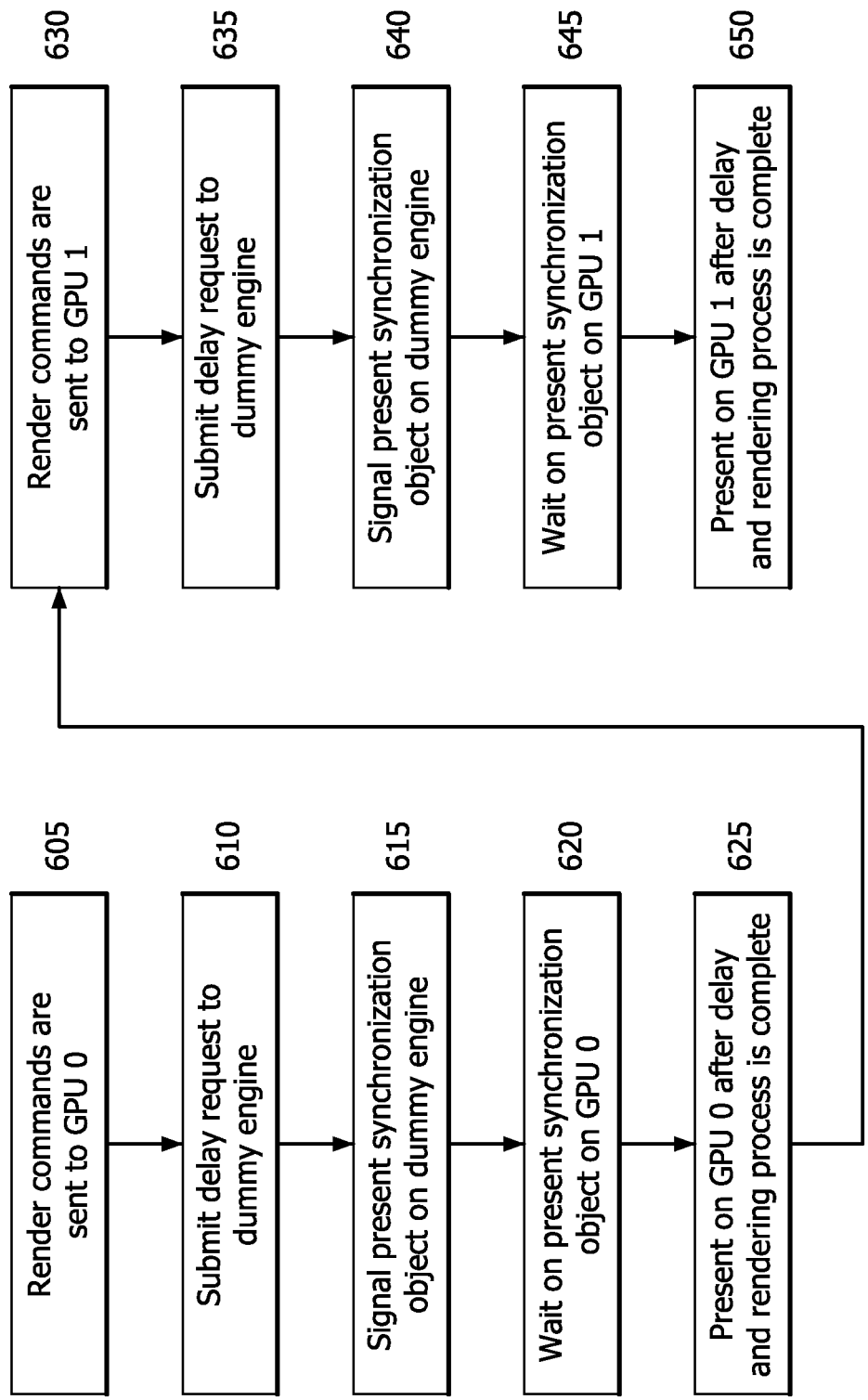
FIG. 6 is another example flowchart for frame pacing in accordance with some embodiments.
Figure 7:
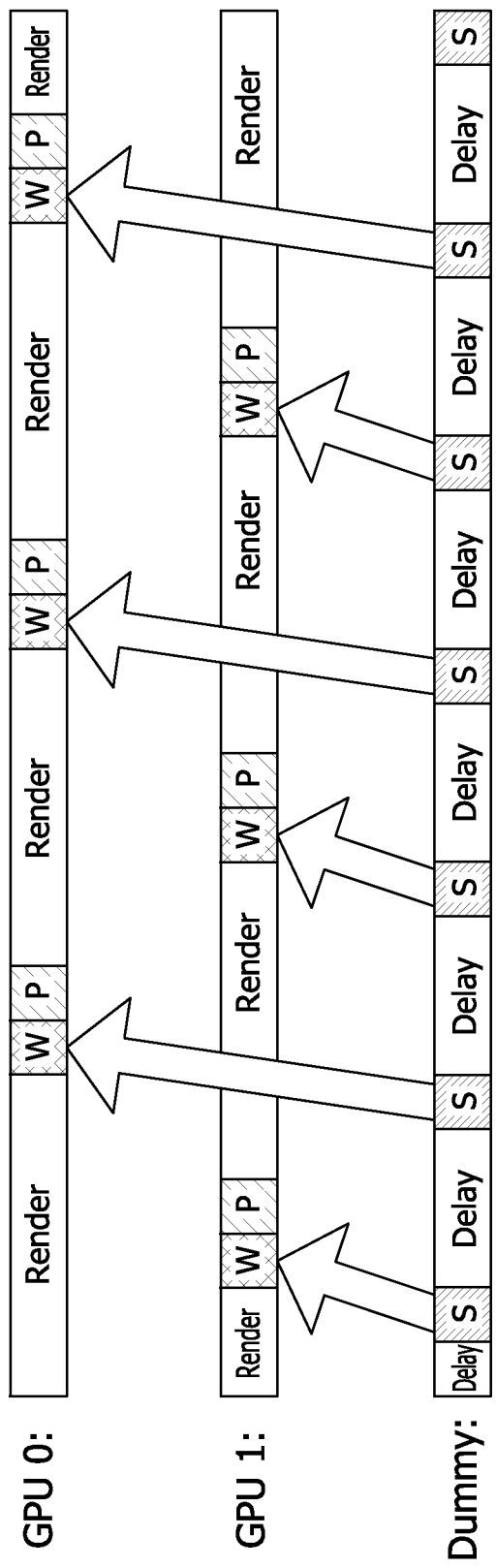
FIG. 7 is an example of a sequence diagram for frame pacing in accordance with some embodiments.

FIG. 4 shows an example of a two GPU architecture 400; FIG. 5 shows a high level flowchart 500; FIG. 6 shows an example flowchart for the two GPU architecture 400; and FIG. 7 shows a high level example of frame pacing flow or sequence 600 from an UMD perspective for the two GPU architecture 400. These figures collectively illustrate frame pacing as described herein. The system architecture may include any number of CPUs, GPUs, processors and the like without deviating from the scope of the invention described herein. In particular, the two GPU architecture 400 include a CPU 405 coupled to GPU 410 and GPU 415, which in turn are coupled to a display 420. Each GPU 410 and 415 may have a timer 412 and 417 to signal starting and completion of the delay as described herein below.

Referring now to FIGS. 4 and 5, an estimate is made as to how long it takes to render a frame (505). This may be done by measuring how long it takes for the GPUs 410 and 415 to render the frame. For example, timestamp queries may be used to measure how long it takes for the GPUs to render the frames. An average over several recent frames is used to smooth out differences in workload from frame to frame and render speeds of the GPUs (510). A heartbeat is created that controls the progress of the GPUs and smooths out their presents (515), where a heartbeat is a pulse or steady ticking of when frames should be presented. The determined appropriate amount of time is waited in the kernel mode driver (KMD)) so that the frames are evenly spaced (520). For example, a dummy schedulable engine is created in the KMD. A user mode driver (UMD) submits dummy command buffers to this dummy engine to request a delay, (which may be 90-95% of expected frame time). The KMD reports the command buffer as complete when the requested delay has passed (525). In the event that the rendering process takes longer than the delay, then the present will be done as soon as the rendering process is complete. In effect, the delay is a minimum wait time for a GPU to present a frame. The UMD submits signals of a Microsoft® (MS) synchronization object to the dummy engine. The UMD waits on this synchronization object on the regular 3D engines.

Referring now to FIGS. 6 and 7, for the two GPU architecture 400, a render command is sent to GPU 0 (605). The UMD, (a UMD is shown in FIG. 2), submits a delay request to a dummy engine in the KMD, (a KMD is shown in FIG. 2), (610). This is shown as a "Delay" in the dummy engine flow in FIG. 7. As described and shown herein below, the Delay effectively provides a minimum amount of time after which a GPU can present. That is, if the rendering process is complete prior to the running of the Delay, then the GPU presents after the running of the Delay. A signal is sent by the dummy engine to GPU 0 (615). This is shown as "S" in FIG. 7. GPU 0 waits the requisite delay time (620). This is shown as "W" in FIG. 7. GPU 0 presents after the requisite delay time (625). This is shown by the "P" in FIG. 7. The sequence is then repeated for GPU 1. In particular, a render command is sent to GPU 1 (630). The UMD submits a delay request to a dummy engine in the KMD (635). A signal is sent by the dummy engine to GPU 1 (640). GPU 1 waits the requisite delay time (645). GPU 1 presents after the requisite delay time (650) is over and the rendering process is complete. That is, the present can be no earlier than the delay period and only if the rendering process is also complete. The sequence is then repeated for GPU 0 and GPU 1.

Figure 8:
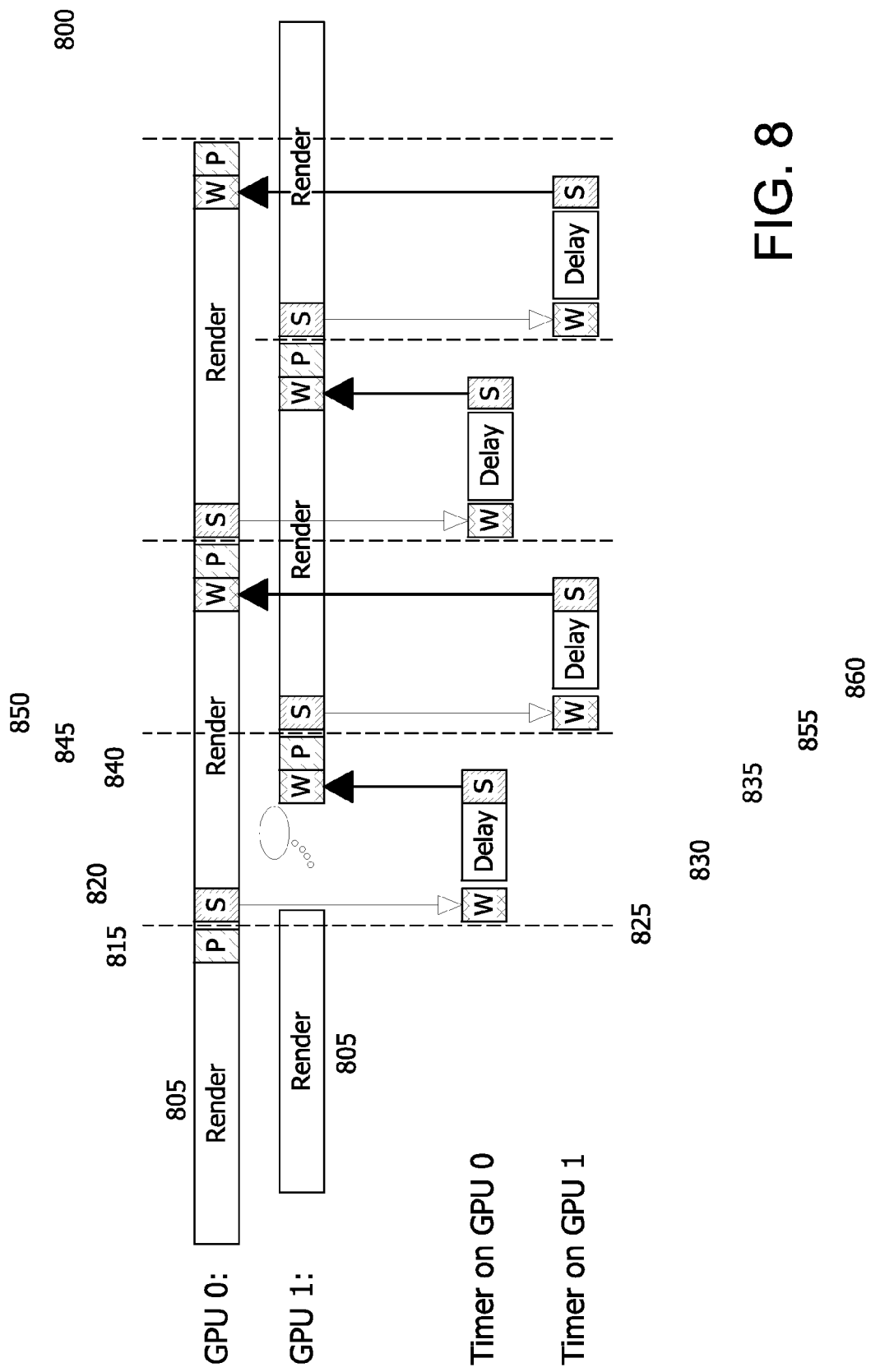
FIG. 8 is an example of a sequence diagram for frame pacing in a dual GPU architecture in accordance with some embodiments.

FIG. 8 shows another high level example of frame pacing flow or sequence 800. A render command 805 is sent to GPU 0 and a render command 810 is sent to GPU 1. The GPU 0 presents (P) 815 and also signals (S) 820 a timer on GPU 0 (via a UMD as shown in FIG. 2) to wait (W) 825 a certain amount of time (Delay) 830 before GPU 1 presents. After waiting the Delay 830 (as shown by the "bubble"), the timer on GPU 0 sends a signal (S) 835 to GPU 1 that the wait (W) 840 is over and that GPU 1 can present (P) 845. The GPU 1 then signals (S) 850 a timer on GPU 1 (via a UMD as shown in FIG. 2) to wait (W) 855 a certain amount of time (Delay) 860 before GPU 0 presents. In this instance, the Delay 860 coincides with the time needed by GPU 0 to complete the rendering process. This is illustrated by the fact that no "bubble" is shown in the later sequences. Effectively, once the Delay is introduced to offset the rendering processing between GPU 0 and GPU 1 and align the processing between GPU 0 and GPU 1, then the offset will always be present and the delay will have nearly no effect on throughput or frame rate. If for some reason, one of the GPUs does get out of alignment, the offset will correct the alignment.

In an embodiment, frame pacing may affect present device driver interfaces (DDIs) and not non-present DDIs.

In the embodiments described herein, the calculations for frame time and managing are done in the UMD. In other embodiments, the calculations for frame time and managing are done in the KMD.

In an embodiment, the amount of delay may be tuned.

Figure 9:
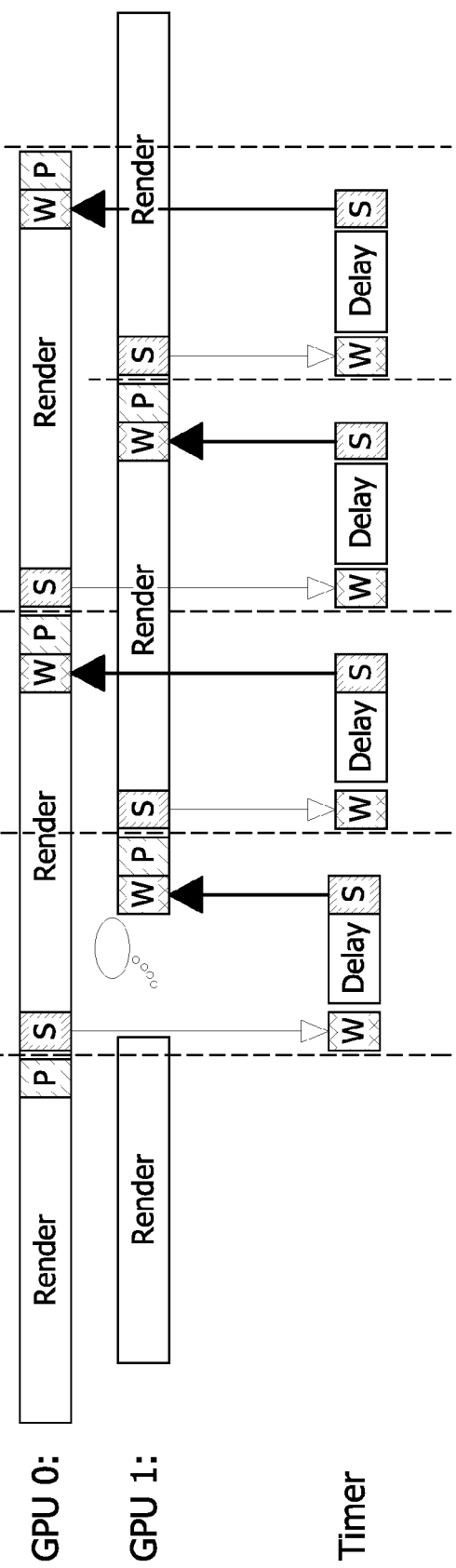
FIG. 9 is an example of a sequence diagram for frame pacing with one timer in accordance with some embodiments.

In an embodiment, one timer may be used to implement frame pacing in a multiple GPU architecture. This is illustrated in FIG. 9 and works similarly to FIG. 8 except that one timer is used.

In an embodiment, the frame pacing described herein may be utilized in hardware compositing architecture, hardware flipping architecture and/or a software compositing architecture.

Figure 10:
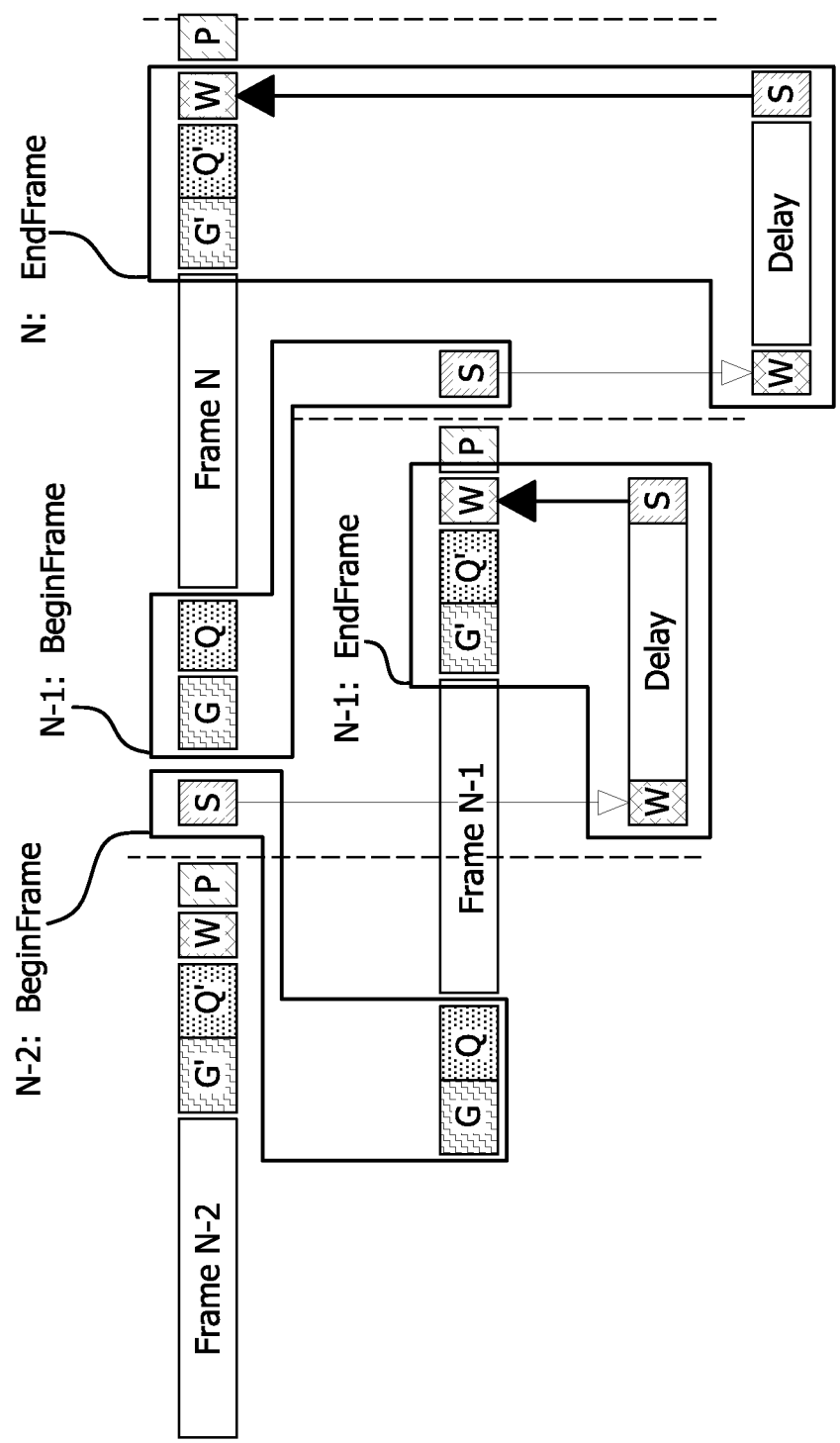
FIG. 10 is an example of actions in a sequence diagram for frame pacing in accordance with some embodiments.

Referring to FIG. 10, there is an example illustration of timestamp queries as described herein above. In particular, FIG. 10 shows the actions on dual-GPUs. Two query objects are used in every frame—one at the beginning of a frame, denoted as (Q), and one at the end of a frame, denoted as (Q'). A GetData, (G for Q and G' for Q'), on a query object retrieves the time when the query object is processed by the GPU. The interval between Q and Q' is the frame time. BeginFrame( ) is called at the beginning of a frame, and inserts Q to a GPU. EndFrame( ) is called at the end of a frame, and inserts Q' to a GPU, (the number in FIG. 10 shows when this call happens in an example driver).

Figure 11:
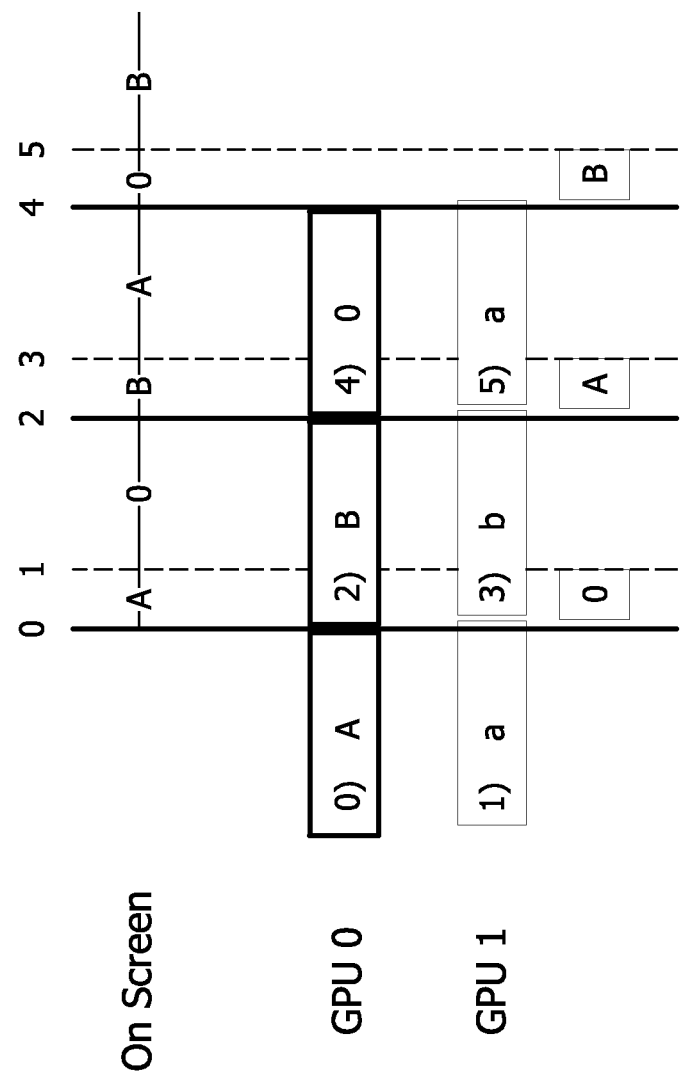
FIG. 11 is an example diagram of stuttering in a symmetrical architecture.

On a multi-GPU system, it is possible only the Master GPU (GPU 0) is driving screen outputs while other GPU(s) are not. Software compositing is used in this scenario which copies every Slave frame to the Master GPU for display. Software compositing suffers micro-stuttering as well as hardware compositing. FIG. 11 shows an example of symmetrical crossfire (1:1) stuttering, where symmetrical crossfire means the same type of GPUs are being used in the processor or system. An extra surface (0) is created on GPU 0 to eliminate tearing. A thick weighted vertical line is a flip on the master's 3D engine while a dashed line is on the master's SDMA engine. A thin weighted shadow box stands for a software compositing SDMA transfer and its target. Other boxes are 3D cmdbufs—the number in a box is the frame number, the letter is the render target. For each Slave frame, three operations need to be serialized: GPU 1 finishes rendering the frame on its 3D engine; GPU 1 transfers the frame to GPU 0 via its SDMA engine, and GPU 0 presents the frame to on-screen via its SDMA engine. It is clear frames 0, 2 and 4 stay on screen much shorter than frames 1, 3 and 5.

Figure 12:
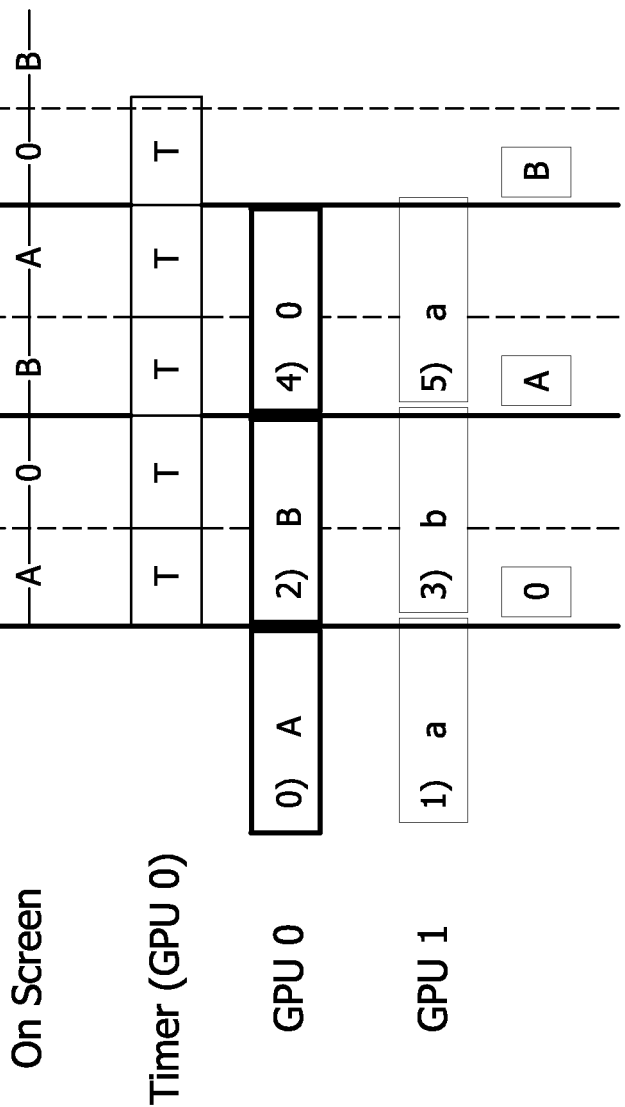
FIG. 12 is an example diagram of frame pacing or anti-stuttering in a symmetrical architecture in accordance with some embodiments.

In a dual GPU architecture example, a timer on GPU 0 with a delay is used to implement frame pacing as shown in FIG. 12, where all presents are of equal length. The delay may be computed as shown in Equation 1:

$$T = \frac{T_{Bottleneck}}{2} = \frac{1}{2}\max\{GfxTime_{Gpu0}, GfxTime_{Gpu1}, SdmaTime\} \qquad \text{Equation 1}$$

where $GfxTime_{Gpu0}$ is the time GPU 0 takes to render a frame, $GfxTime_{Gpu1}$ is the time GPU 1 takes to render a frame and SdmaTime is the time the SDMA engine takes to transfer a frame from GPU 1 to GPU 0.

Figure 13:
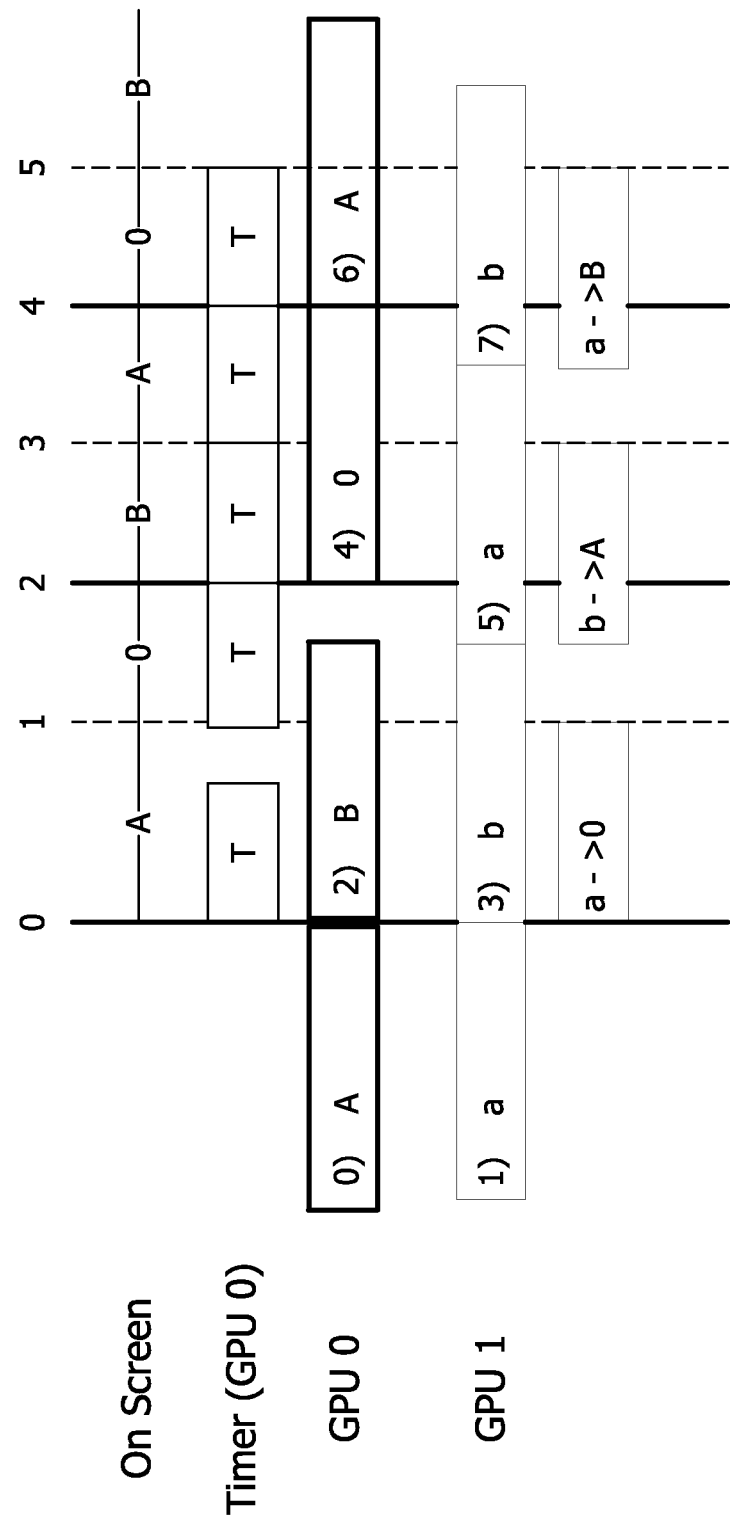
FIG. 13 is an example diagram of stuttering in a symmetrical architecture where $$T_{SDMA} > \frac{T_{GFX}}{2};$$
Figure 14:
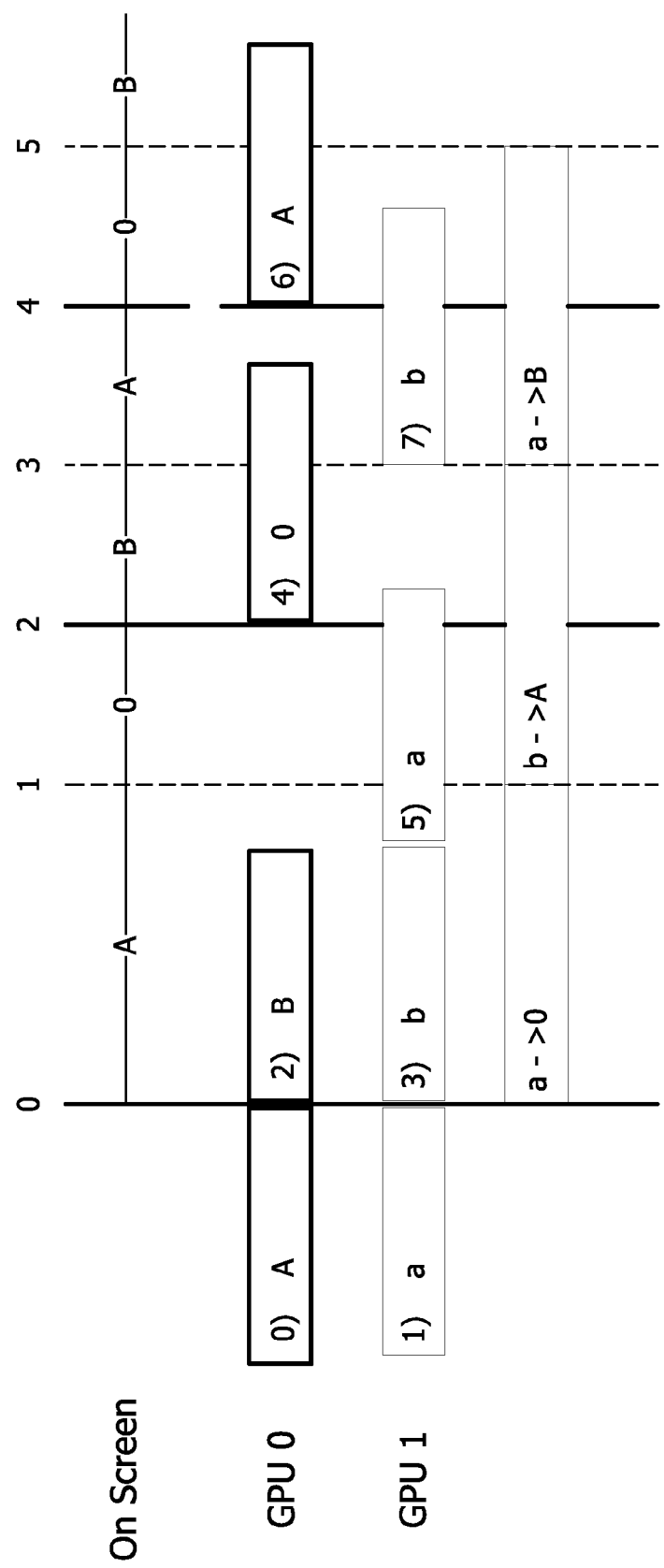
FIG. 14 is an example diagram of stuttering in a symmetrical architecture where $T_{SDMA} > T_{GFX}$.

In an example of slow transfer, assume GPU 0 and GPU 1 takes the same time to render a frame, $T_{GFx}=GfxTime_{Gpu0}=GfxTime_{Gpu1}$. If $$T_{SDMA} > \frac{T_{GFX}}{2},$$

frame N+1 on GPU 1 completes earlier than frame N on GPU 0. As shown in FIG. 13, frame 5 is done before frame 4, frame 7 is done before frame 6, and so on. This layout is vulnerable to cross-GPU resource transfers. FIG. 14 show an example of where transfer is the bottleneck and $T_{SDMA}>T_{GFX}$. Although the above slow transfer issue is theoretically possible, the slow transfer example has no practical effect in real world applications.

Figure 15:
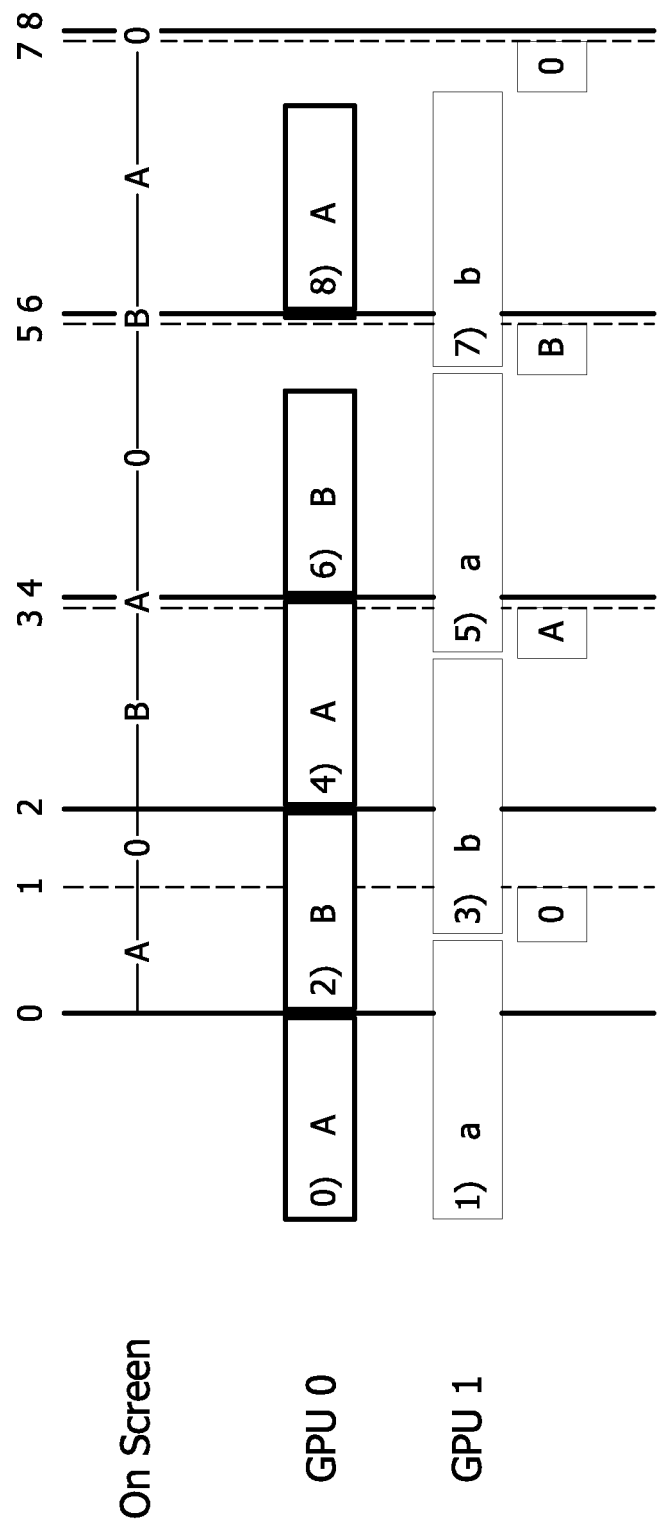
FIG. 15 is an example diagram of stuttering in a slow slave scenario.
Figure 16:
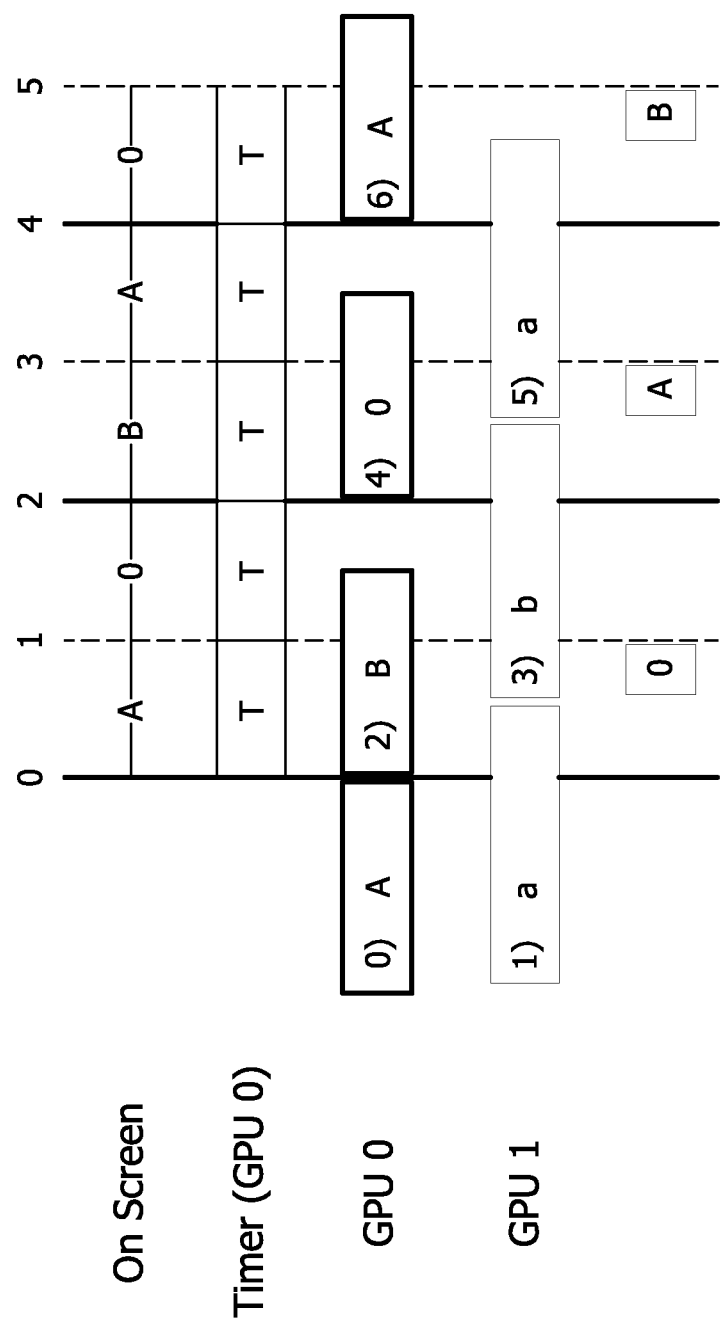
FIG. 16 is an example diagram of anti-stuttering in a slow slave scenario in accordance with some embodiments.
Figure 17:
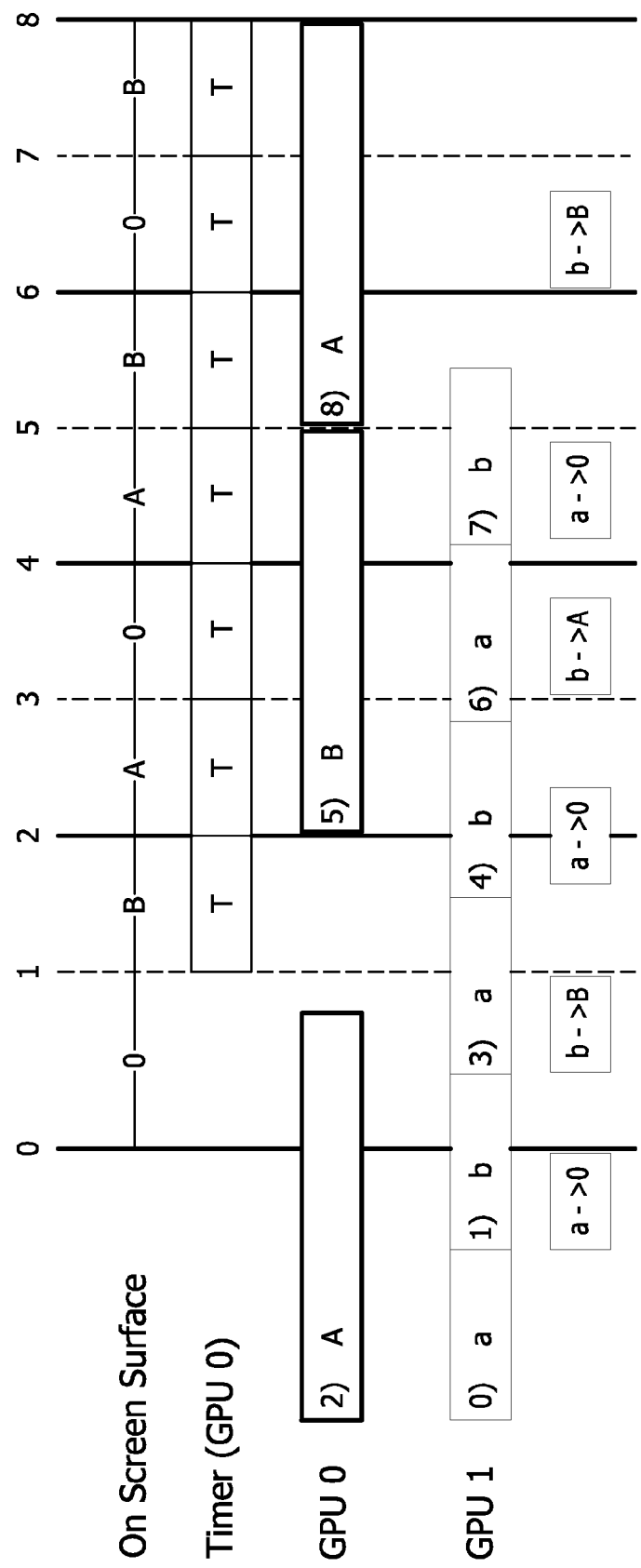
FIG. 17 is an example diagram of anti-stuttering in a slow slave scenario where asymmetric crossfire (ACF) is 1:2 and where "1" is the bottleneck, in accordance with some embodiments.
Figure 18:
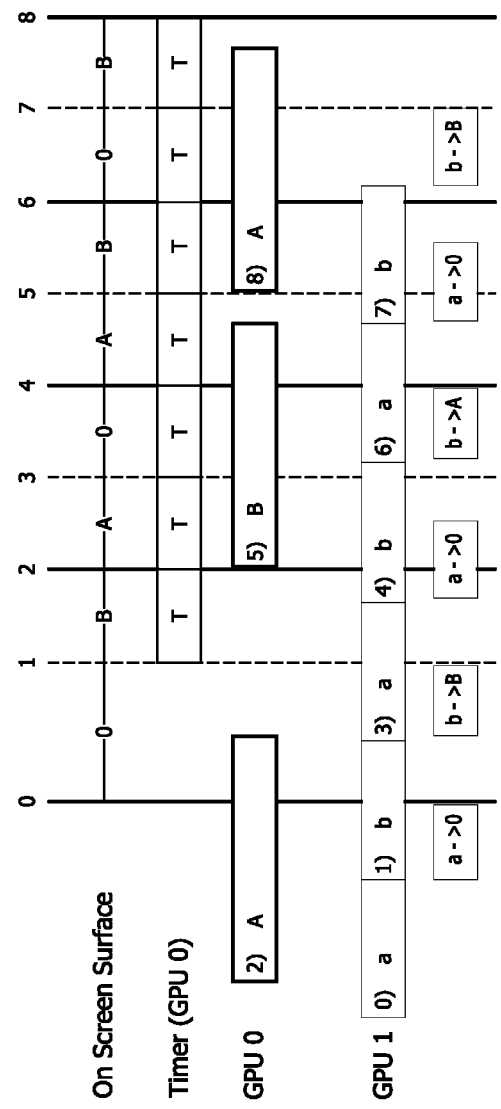
FIG. 18 is an example diagram of anti-stuttering in a slow slave scenario where ACF is 1:2 and where "2" is the bottleneck, in accordance with some embodiments.

FIGS. 15-18 are similar to FIGS. 11-14, but for the asymmetric crossfire (ACF) architecture where the GPUs don't render at the same rate. FIGS. 17 and 18 show ACF when the AFR ratio is unbalanced at 1:2, that is one GPU renders 2 out of 3 frames.

FIG. 15 shows an example of a slow slave issue with ACF 1:1 and FIG. 16 shows a frame pacing implementation to address slow slave issues.

In ACF 1:2 architecture, whether to flip the master's frames on 3D or SDMA does not matter. The reason is that frame 5 has to wait for B to be off screen.

FIG. 17 shows how a solution for ACF 1:2, where "1" is the bottleneck and $GfxTime_{Gpu1}$ is the sum of two successive frames on GPU 1.

FIG. 18 shows how a solution for ACF 1:2, where "2" is the bottleneck.

In general, a method for frame pacing in a rendering process includes estimating a frame rendering time for each of a plurality of graphics processing units (GPUs), determining a delay based on at least an estimated frame rendering time and inserting the delay into the rendering process to render frames in an evenly spaced manner. In an embodiment, the delay may be dynamically adjusted based on application workload on the GPUs. In an example, the estimated frame rendering time is an average taken over a predetermined amount of frames. In an example, a heartbeat is established based on at least the delay to control the rendering process and frame presents. In an example, at least one timer is used to enable the delay. In an example, timestamp queries are used for determining the estimated frame rendering time. In an example, the delay is implemented in a kernel mode driver (KMD). A dummy schedulable engine is created in the KMD to implement the delay. A present occurs at the latter of expiration of the delay or completion of the rendering process.

A system for frame pacing in a rendering process includes a first processing module configured to estimate a frame rendering time for each of a plurality of graphics processing units (GPUs). The first processing module is configured to determine a delay based on at least an estimated frame rendering time. A second processing module is configured to insert the delay into the rendering process to render frames in an evenly spaced manner. In an embodiment, the delay may be dynamically adjusted based on application workload on the GPUs. In an example, the estimated frame rendering time is an average taken over a predetermined amount of frames. In an example, a heartbeat is established based on at least the delay to control the rendering process and frame presents. In an example, at least one timer is used to enable the delay. In an example, timestamp queries are used for determining the estimated frame rendering time. In an example, the second processing module is a kernel mode driver (KMD). A dummy schedulable engine is created in the KMD to implement the delay. A present occurs at the latter of expiration of the delay or completion of the rendering process. In an example, the first processing module may be a UMD and the second processing unit may be a KMD.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for frame pacing in a rendering process, the method comprising:
    estimating a frame rendering time for each of a plurality of graphics processing units (GPUs);
    determining a delay based on at least an estimated frame rendering time; and
    inserting the delay into the rendering process to render frames in an evenly spaced temporal manner.

2. The method of claim 1, wherein the delay is dynamically adjusted based on application workload on the GPUs.

3. The method of claim 1, wherein the estimated frame rendering time is an average taken over a predetermined amount of frames.

4. The method of claim 1, wherein a heartbeat is established based on at least the delay to control the rendering process and frame presents.

5. The method of claim 1, wherein at least one timer is used to enable the delay.

6. The method of claim 1, wherein timestamp queries are used for determining the estimated frame rendering time.

7. The method of claim 1, wherein the delay is implemented in a kernel mode driver (KMD).

8. The method of claim 7, wherein a dummy schedulable engine is created in the KMD to implement the delay.

9. The method of claim 1, wherein a present occurs at the latter of expiration of the delay or completion of the rendering process.

10. A system for frame pacing in a rendering process, comprising:
    a processor including a first processing module configured to estimate a frame rendering time for each of a plurality of graphics processing units (GPUs) and configured to determine a delay based on at least an estimated frame rendering time; and
    the processor including a second processing module configured to insert the delay into the rendering process to render frames in an evenly spaced temporal manner.

11. The system of claim 10, wherein the delay is dynamically adjusted based on application workload on the GPUs.

12. The system of claim 10, wherein the estimated frame rendering time is an average taken over a predetermined amount of frames.

13. The system of claim 10, wherein a heartbeat is established based on at least the delay to control the rendering process and frame presents.

14. The system of claim 10, wherein at least one timer is used to enable the delay.

15. The system of claim 10, wherein timestamp queries are used for determining the estimated frame rendering time.

16. The system of claim 10, wherein the second processing module is a kernel mode driver (KMD).

17. The system of claim 16, wherein a dummy schedulable engine is created in the KMD to implement the delay.

18. The system of claim 10, wherein a present occurs at the latter of expiration of the delay or completion of the rendering process.

* * * * *